(12) United States Patent
Jones

(10) Patent No.: US 6,719,079 B2
(45) Date of Patent: Apr. 13, 2004

(54) GROUND EFFECT VEHICLE USING A FRONTAL RAM AIR STREAM AND AERODYNAMIC LIFT

(76) Inventor: William Larry Jones, 1711 Grand Ave., Santa Barbara, CA (US) 93103

( * ) Notice: Subject to any disclaimer, the term of this patent is extended or adjusted under 35 U.S.C. 154(b) by 0 days.

(21) Appl. No.: 10/246,850

(22) Filed: Sep. 17, 2002

(65) Prior Publication Data

US 2004/0050602 A1 Mar. 18, 2004

(51) Int. Cl.⁷ ................................................. B60V 1/04
(52) U.S. Cl. ..................................... 180/126; 180/116
(58) Field of Search ............................... 180/116, 117, 180/118, 119, 120, 121, 122, 123, 124, 125, 126, 127, 128, 130, 129

(56) References Cited

U.S. PATENT DOCUMENTS

| | | | | |
|---|---|---|---|---|
| 1,957,896 A | * | 5/1934 | Marguglio | 244/23 R |
| 2,364,676 A | * | 12/1944 | Warner | 244/15 |
| 2,364,677 A | * | 12/1944 | Warner | 244/15 |
| 2,989,269 A | * | 6/1961 | LeBel | 244/12.3 |
| 3,401,766 A | | 9/1968 | Laufman et al. | |
| 3,529,566 A | | 9/1970 | Troeng | |
| 3,656,575 A | * | 4/1972 | Vryland | 180/120 |
| 3,826,449 A | * | 7/1974 | Nelson et al. | 244/100 R |
| 3,827,527 A | * | 8/1974 | Bertelsen | 180/120 |
| 3,869,020 A | * | 3/1975 | Holland | 180/120 |
| 4,046,215 A | | 9/1977 | Hietanen et al. | |
| 4,666,012 A | | 5/1987 | Howell et al. | |
| 4,712,630 A | * | 12/1987 | Blum | 180/117 |
| 4,828,058 A | * | 5/1989 | Bjorn-Ake | 180/116 |
| 5,386,880 A | * | 2/1995 | Dubose | 180/117 |
| 6,158,540 A | | 12/2000 | Rice et al. | |

FOREIGN PATENT DOCUMENTS

WO    WO99/33690    7/1999

\* cited by examiner

*Primary Examiner*—Daniel G. DePumpo
(74) *Attorney, Agent, or Firm*—Gene Scott - Patent Law & Venture Group

(57) ABSTRACT

A ground effect vehicle apparatus comprising a vehicle body of integral and contiguous construction including a medial portion having an aerodynamic upper surface, and a pair of spaced apart laterally positioned portions separated by the medial portion. Lower extremities of the laterally positioned portions extend downwardly below the medial portion to restrain air flow between them as it moves toward the rear of the body. Forward extremities of the laterally positioned portions extend forward of the medial portion to, again, restrain air flow from moving laterally. Power plants are mounted within the medial portion and support aircraft type propellers positioned forward of the medial portion of the body. The propellers are mechanized for moving over an arcuate vertical range, such that their force vectors are directable between the horizontal and approximately 45 degrees above the horizontal. In this manner, the propeller forces ram air below and to the rear of the medial portion of the vehicle body thereby developing cushion effect lift and forward thrust.

5 Claims, 2 Drawing Sheets

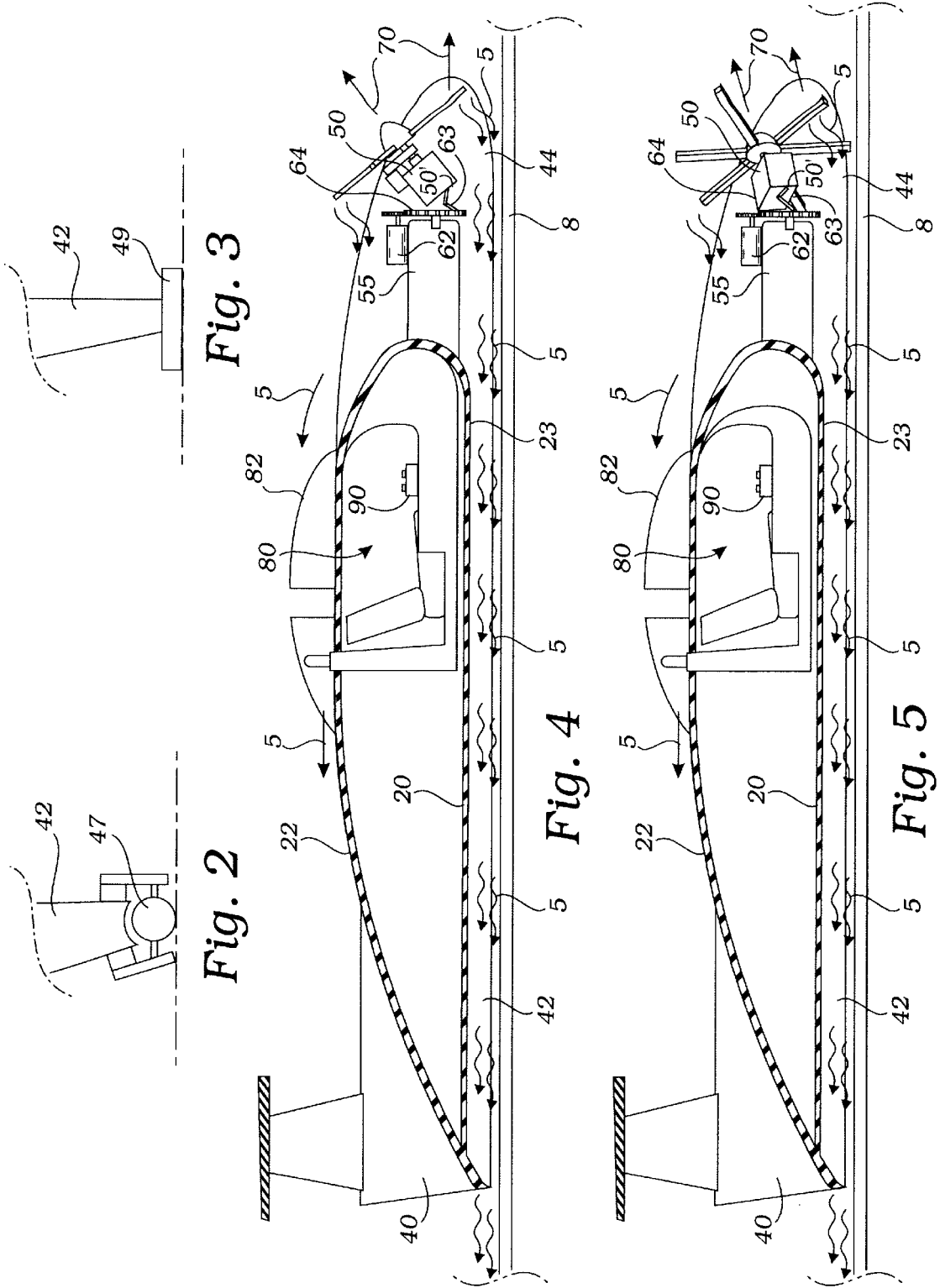

GROUND EFFECT VEHICLE USING A FRONTAL RAM AIR STREAM AND AERODYNAMIC LIFT

BACKGROUND OF THE INVENTION

INCORPORATION BY REFERENCE: Applicant hereby incorporates herein by reference, any and all U.S. patents, and U.S. patent applications, cited or referred to in this application.

1. Field of the Invention

This invention relates generally to ground effect vehicles and more particularly to such a vehicle wherein a ram air stream is induced forward of the vehicle's body.

2. Description of Related Art

The following art defines the present state of this field:

Laufman et al., U.S. Pat. No. 3,401,766 describes an air-cushion vehicle that is a combination of a thin walled self-supporting shell with an open bottom forming an air-cushion chamber, said shell having an air intake opening at its forward end and having a cockpit opening; a cockpit structure suspended from the shell in the cockpit opening and being bonded to the shell to reinforce the adjacent portion of the shell; a fan mounted in the intake opening to force air into the air-cushion chamber; power means to actuate said fan to maintain air under pressure in the air-cushion chamber; and elongated means mounted on the lower periphery of the shell to serve as a bumper, said elongated means being made of foamed plastic to serve as float means to support the vehicle on water, said elongated means forming an upwardly tilted nose on the front end of the shell.

Troeng, U.S. Pat. No. 3,529,566 describes a catamaran-type vehicle that embodies an airplane-type wing-like member connecting, and at right angles to, plural pontoons and an inclined helicopter rotor forward of the wing-like member and adapted to blow an air stream under said connecting wing-like member. The rotor shaft is mounted for inclination laterally as well as forward and backward.

Hietanen et al., U.S. Pat. No. 4,046,215 describes a propeller driven vehicle, such as an air cushion hovercraft, comprising a hull, a teardrop shaped cabin mounted on the hull and a propeller arranged in front of the cabin. A gutter shaped obstructing plate is pivotally mounted to each sidewall of the cabin and is movable between a horizontal and vertical position. When the obstructing plate is moved from its horizontal position to obstruct the airflow from the propeller around the sidewall of the cabin, a pressure differential is created on the cabin, which is effective in steering the vehicle.

Howell et al., U.S. Pat. No. 4,666,012 describes a vehicle utilizing a pair of counter rotating lift fans driven by an air cooled internal combustion engine providing compressed air into a plenum under a shell moving the vehicle away from the surface upon which it is resting with the gas escape velocity evenly distributed around a peripheral skirt. A separate forward thrust fan driven directly by a rotating pedestal mounted engine provides the forward propulsion. An aileron is rotatably mounted directly behind the thrust fan and provides controlled response to the pitch direction of the vehicle by changing the angle of the airflow discharge. The vehicle contains a pair of movable keels for operation on the water and side wings to extend the effective surface of the craft.

Rice et al., U.S. Pat. No. 6,158,540 describes a ground effect flying craft utilizing a pressure cavity for low speed support on a static air cushion. The cavity is bounded by a streamlined aft body, a fore body, and side plates, which allow for low drag and high lift at cruise speed on a dynamic air cushion. Static lift pressure and dynamic thrust are provided by a fixed dual-purpose propulsor. Flows diverting devices or auxiliary power units are not needed for transition from static lift to dynamic flight.

Nazarov, WO 99/33690 describes a Wing-In-Ground-Effect vehicles (WIGs, also called Ekranoplans). Specifically, a WIG vehicle capable of starting and landing on unprepared terrain or water surfaces. This vehicle incorporates new lift increasing features, namely a system using ducted lift fans suctioning air from the wing upper surfaces and creating a multi-chamber air cushion under the fuselage and wings of the vehicle. Each lift fan will be powered by a turbine actuated by high-pressure combustion gases diverted from the main power units. The WIG's flight control system distributes power between the lift fans and the forward propulsion units, though valves in the high-pressure gas conducts leading to turbines powering the lift fans or the forward propulsion units. Starting with 100% of the power directed to the lift fans for hovering, the available power is gradually transferred to the forward propulsion units. As the speed increases, an increasing amount of lift is generated dynamically until the Wing-In-Ground effect is enough to carry the vehicle on its own and 100% of the power is available for forward thrust. The lift fans are mounted in the fuselage-wing junctions and suspended passenger or freight modules can be fastened to the wing end plates.

The prior art teaches pitch controlled ground effect vehicles, air cushion vehicles, such with take-off aid, such with static air cushions for low speeds, and a boat with rotor above a wing of a catamaran; but does not teach a ground effect vehicle with forward mounted and tilting power plant. The present invention fulfills these needs and provides further related advantages as described in the following summary.

SUMMARY OF THE INVENTION

The present invention teaches certain benefits in construction and use which give rise to the objectives described below.

A ground effect vehicle apparatus comprising a vehicle body of integral and contiguous construction including a medial portion having an aerodynamic upper surface, and a pair of spaced apart laterally positioned portions separated by the medial portion. Lower extremities of the laterally positioned portions extend downwardly below the medial portion to restrain air flow between them as it moves toward the rear of the body. Forward extremities of the laterally positioned portions extend forward of the medial portion to, again, restrain air flow from moving laterally. Power plants are mounted within the medial portion and support aircraft type propellers positioned forward of the medial portion of the body. The propellers are mechanized for moving over an arcuate vertical range, such that their force vectors are directable between the horizontal and approximately 45 degrees above the horizontal. In this manner, the propeller forces ram air below and to the rear of the medial portion of the vehicle body thereby developing cushion effect lift and forward thrust. Also, the propellers are rotated laterally to the left or right so as to develop left or right turning vectors, and this is accomplished by rotation of the power plant.

A primary objective of the present invention is to provide an apparatus and method of use of such apparatus that provides advantages not taught by the prior art.

Another objective is to provide such an invention capable of being drawn in a forward direction over a firm surface by forward mounted propellers.

A further objective is to provide such an invention capable of gliding on a cushion of air.

A still further objective is to provide such an invention capable of developing forced lift below and above the craft.

A still further objective is to develop turning forces by canting and rotating propellers of the craft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIGS. 2 and 3 are partial front elevational views of one of the lower extremities thereof with a roller and a snow ski enablement respectively;

FIGS. 4 and 5 are sectional views thereof as taken along line 2—2 in FIG. 1, illustrating the position of propeller 60 for forward thrust and levitation in FIG. 5, and rotation of a propeller gear plate of the invention to position the propeller to one side to produce turning thrust.

DETAILED DESCRIPTION OF THE INVENTION

Figure 1:
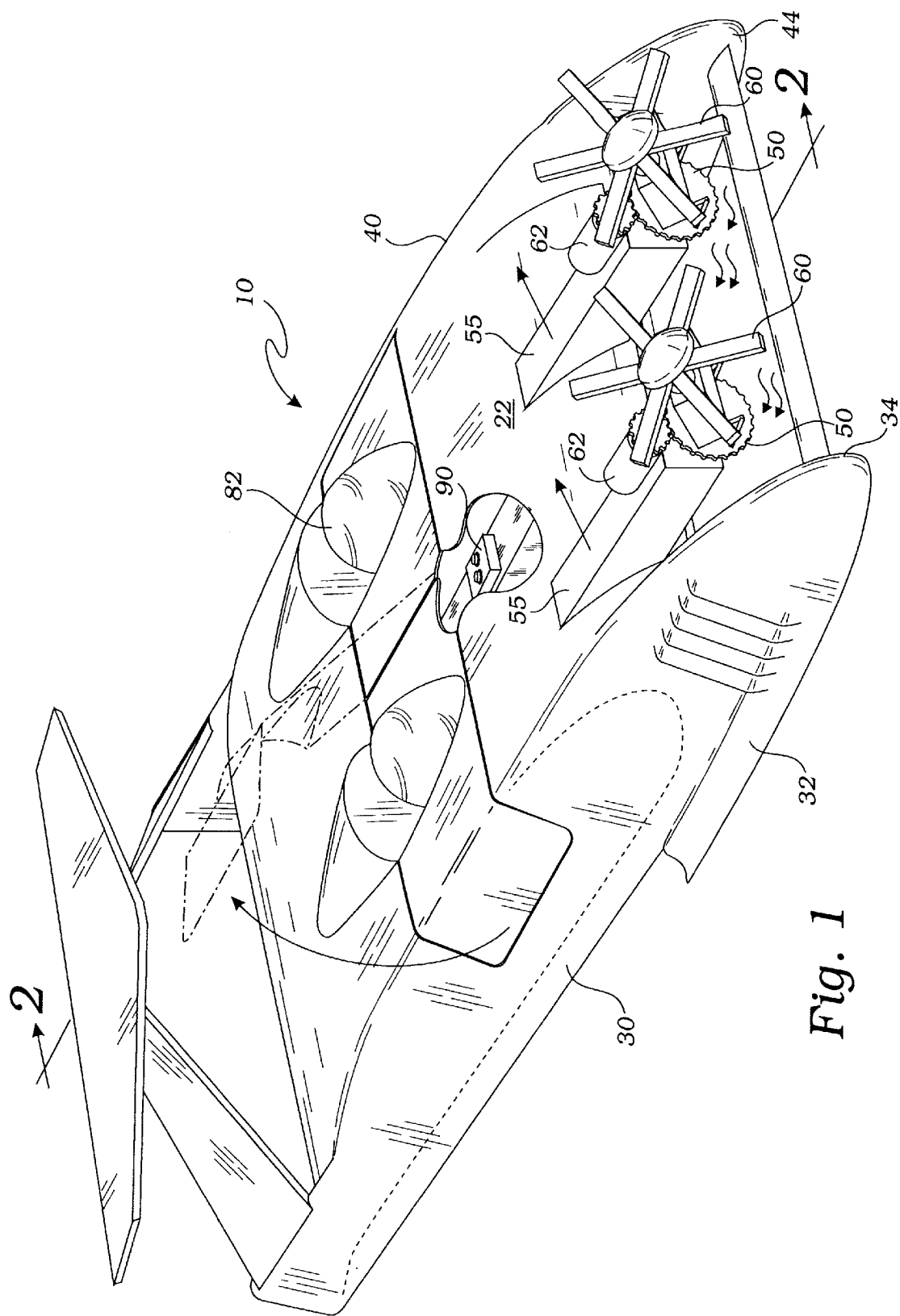
FIG. 1 is a perspective view of the preferred embodiment of the invention.

The above described drawing figures illustrate the invention in at least one of its preferred embodiments, which is further defined in detail in the following description.

The present invention is a ground effect vehicle apparatus comprising a vehicle body 10 of integral and contiguous construction including a medial portion 20 having an aerodynamic upper surface 22, and a pair of spaced apart laterally positioned portions 30, 40 which are separated by the medial portion 20. Preferably, the body 10 is constructed of light-weight materials as are used for constructing aircraft gliders and similar very light but strong machines. The lower extremities 32, 42 of the laterally positioned portions 30, 40 extend downwardly below the medial portion 20 and act as air flow dams, trapping flowing air below the medial portion 20. The forward extremities 34, 44 of the laterally positioned portions 30, 40 extend forward of the medial portion 20, again trapping air flow that might otherwise escape to one or the other sides of the body 10. One or more power plants 50, preferably dual internal combustion engines, are mounted in a forward position, as best seen in FIG. 1. The power plants 50 preferably engage aircraft propellers 60 which are positioned forward of the power plants 50 and rotate in opposing directions so as to neutralize torque developed vehicle turning forces. The propellers 60 are mounted and functionally enabled for moving over an arcuate range of angles such that a force vector 70 developed by each of these propellers 60 is movable between the horizontal and approximately 45 degrees above the horizontal, as shown by arrow 70 in FIGS. 4 and 5. The propellers 60 force ram air 5 below and to the rear, of the medial portion 20 of the vehicle body 10 for developing cushion effect lift and forward thrust.

The above described aerodynamic body with ram air levitation and lifting forces may be constructed as a toy, as a demonstration vehicle, and as a practical transport for sport, fun or industry. It may be constructed in many forms to fit these usages and may have one propeller, or more than two propellers as the needs for such dictate. Other forms of propulsion may be used other than internal combustion engines, such as electric motors or reaction engines, such as jets or rockets of various types well known in the art. As shown in the figures, a cockpit 80 may be incorporated into the body 10 along with controls 90 and cockpit hatch covers 82, wherein, in FIG. 1 a hatch cover 82 on the right side of the vehicle is shown in phantom line, in an open attitude. Clearly, other configurations of the present invention may be designed by those of skill in the art.

In operation, the body 10 is lifted above the ground or supporting surface 8 by ram air 5 forced below the medial portion 20 from the rotating propellers 60. Air moving over upper surface 22 also develops lift through aerodynamic effects because of the airfoil shape of the medial portion 20. It should be noticed that air flow 5 is free to move at a rapid and unrestricted velocity over the upper surface 22 of the medial portion 20, thereby establishing a lower pressure on the upper surface 22 relative to the bottom surface 23 of the medial portion where the air flow 5 moves more slowly due to the lower aerodynamic curvature of the body and also due to the restricted space. Also, we find laminar flow above the medial portion 22 as shown by the straight arrows depicting such laminar flow, while we find non-laminar air flow below surface 23 (depicted by wavy arrows), again contributing to aerodynamic lift on the body 10. It is well known in aerodynamic design that laminar air flows at a more rapid rate than non-laminar air flow and thus develops a lower dynamic pressure on the surfaces over which it moves. It should be noted also, that when the body 10 is moving in a forward direction, the air moving under and over the body 10 is enhanced due to the forward motion. Therefore, during startup, the thrust vector 70 is moved to a relatively greater angle above the horizontal in order to force more ram air under the body 10. This is shown in FIG. 4. When the apparatus is moving at its cruising speed, the vector 70 is moved to a relatively more horizontal direction using jacking device 63 or other servomechanism to tilt power plants 50 about pivot axle 50' (FIG. 5), which causes higher forward speed and greater aerodynamic lift, i.e., requiring less ram air flow lift.

Numeral 55 is used to identify fuel tanks which are mounted forward of the medial portion 20. A rotating gear plate 64 is mounted for rotation on the fuel tank 55. Gear drive 62 is mounted on fuel tank 55 as well, and uses an electric motor to turn the gear plate 64. With the propeller 60 positioned as shown in FIG. 5, rotation of gear plate 64, using gear drive 62, causes thrust vector 70 to be partially diverted to one side or the other of the apparatus thereby producing a turning effect to left or right.

In actual trials, scale models of the present invention have been clocked at speeds approaching 100 scale miles per hour. Therefore, it is found that a vehicle constructed and operated as defined herein, has the advantage of not requiring wheels, wheel drives, a wheel steering mechanism, axles, suspensions, transmissions, or aerodynamic control surfaces for turning. Additionally the apparatus takes up only as much lateral space as a common automobile since wings are not necessary, and with high speed maneuverability, the apparatus is able to spin almost within its own length dimension.

The present invention may be adapted for operating in several diverse environments. The lower extremities may be adapted as skids, shown in FIG. 1, rollers 47 (FIG. 2), or skis 49 (FIG. 3) to enable the apparatus to more effectively operate over rough surfaces as an air supported vehicle, on smooth hard surfaces, on ice and on snow respectively. When fitted with floats, the apparatus is able to operate as a high speed air-cushion levitated boat. Such adaptations would be within the skill of the routine artisan.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A ground effect vehicle apparatus comprising: a vehicle body of integral and contiguous construction including a medial portion having an aerodynamic upper surface, and a pair of spaced apart laterally positioned portions separated by the medial portion; lower extremities of the laterally positioned portions extending downwardly below the medial portion; forward extremities of the laterally positioned portions extending forward of the medial portion; a pair of fuel tanks mounted to the medial portion and extending forwardly therefrom; a pair of power plants positioned forwardly of the fuel tanks, each of the power plants engaging a propeller thereof functionally enabled for moving over an arcuate range such that a force vector developed by the propeller is movable between horizontal and approximately 45 degrees above the horizontal, for forcing ram air below and to the rear of the medial portion of the vehicle body thereby developing cushion effect lift.

2. The apparatus of claim 1 further providing means for lateral rotation of the propellers enabling left and right steering vectors.

3. The apparatus of claim 1 further comprising a cockpit enabled for control of the apparatus.

4. The apparatus of claim 1 wherein the lower extremities of the laterally positioned portions are adapted for supporting the apparatus for moving in contact with a hard smooth surface.

5. The apparatus of claim 1 wherein the lower extremities of the laterally positioned portions are adapted for supporting the apparatus for moving in contact with a snow covered surface.

* * * * *